United States Patent Office 3,113,137
Patented Dec. 3, 1963

3,113,137
METHOD FOR ISOMERIZING STEREOISOMER-
IC XANTHENE AND THIOXANTHENE COM-
POUNDS VIA THE USE OF OXALIC ACID
Sidney Frank Schaeren, Bottmingen, Reinhard Schläpfer
and Hans Spiegelberg, Basel, and Bruno Peter Vater-
laus, Binningen, Switzerland, assignors to Hoffmann-
La Roche Inc., Nutley, N.J., a corporation of New
Jersey
No Drawing. Filed June 22, 1960, Ser. No. 37,864
Claims priority, application Switzerland June 30, 1959
6 Claims. (Cl. 260—327)

This invention relates to novel chemical processes, and especially to novel processes for isomerization of certain geometrically asymmetric chemical compounds; said compounds being subjected to isomerization either as a single stereoisomeric form or in the form of stereoisomeric mixtures containing an excess of one stereoisomer.

More particularly, the invention relates to processes which comprise treating a geometrically asymmetric 9- (basically substituted-lower alkylidene)-xanthene or -thioxanthene in liquid phase with an acidic reagent.

The compounds referred to above, i.e. 9-(basically substituted-lower alkylidene)-xanthenes and -thioxanthenes, including geometrically asymmetric species thereof, are known in the prior art.

The invention relates particularly to processes for the isomerization of a geometrically asymmetric compound of the formula (I)
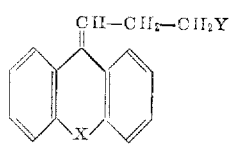

wherein
X represents oxygen or sulfur and
Y represents a tertiary amino group,
said compound being further substituted in an aromatic ring thereof by alkyl, trifluoromethyl, aralkyl, aryl, alkoxy, aralkoxy, aryloxy, alkylthio, aralkylthio, arylthio, halogen, acyl, amino, hydroxyl and/or carboxyl groups.

The tertiary amino group represented in the above Formula I by the symbol Y includes, for example, dialkylamino radicals and tertiary amino heterocyclic radicals, such as 1-piperidyl, 4-morpholyl, 4-(lower alkyl)-1-piperazyl and 4-hydroxyethyl-1-piperazyl. Of the dialkylamino radicals, di(lower alkyl)amino and especially dimethylamino, are preferred.

Geometrically asymmetric compounds referred to above can exist in two steric forms, these two forms being obtained in approximately equal proportions in the known syntheses. Inasmuch as the two isomers are often not of equal importance with respect to their biological activity, ordinarily separation of the isomers is desirable. The possibility of converting the less active isomer, obtained after the separation process, into the biologically more desirable form is therefore a matter of great technical significance. An illustration is afforded by the case of 2-chloro-9-(ω-dimethylamino-propylidene)-thioxanthene. In this case, the higher-melting isomer (M.P. of the base 98–99° C., M.P. of the hydrochloride 225° C.), which isomer is herein designated as the trans form, is the form of greater biological interest and can be used as a tranquillizer and as an anti-emetic agent; whereas the lower-melting isomer (the hydrochloride of which melts at 209°C.), this isomer being herein designated the cis form, possesses desirable biological activity only in a moderate degree, and moreover displays undesired side effects. When the trans form is separated, e.g. by fractional crystallization, the mother liquors remaining comprise up to 80% of the cis isomer.

It has now been found that the isomerization—and thus the conversion of the biologically less desirable form into the biologically preferred form—can be accomplished by treating a geometrically asymmetric compound as defined above in connection with Formula I, which is present exclusively or predominantly in the cis (or alternatively, the trans) form the acidic reagents; and, if desired, converting the salt obtained to the free base.

The acid treatment is suitably effected by means of mineral acids, e.g. sulfuric acid, phosphoric acid or hydrohalic acids, such as hydrochloric acid or hydrobromic acid; or with strong organic acids, such as formic acid, oxalic acid, maleic acid, phthalic acid or halogenated acetic acids, such as trifluoroacetic acid or trichloroacetic acid. Also useful for the acid treatment are the so-called "Lewis acids," especially halides of aluminum or zinc in the presence of oxygen-containing organic solvents such as ethers or alcohols; and also acid-reacting salts and similar susbtances, such as potassium bisulfate and sulfamic acid.

Whereas the invention is not limited by any theory as to its mechanism, it appears that the acid treatment according to the invention involves a chemical equilibrium reaction between the two isomeric forms of the compounds, defined above in connection with Formula I, and the acidic reagents used to effect the isomerization. Accordingly, in principle, the isomerization can be effected at any desired acid concentration. However, in order to effect the isomerization in an advantageous manner, it has been found desirable to proceed according to one of the modes of execution described below.

According to one mode of execution of the processes of the invention, the compound to be isomerized is treated with aqueous or alcoholic mineral acids or with strong organic acids. When aqueous or alcoholic mineral acids are employed it is important that the concentration be less than 8 normal. Advantageously aqueous sulfuric acid is employed, for example 5 N sulfuric acid. The acid concentration can, however, be much lower if desired. Thus, for example, even treatment with 0.5 N hydrochloric acid effects isomerization at boiling temperature. When effecting isomerization in alcoholic medium, lower alkanols are preferred, e.g. methanol, ethanol, n-propanol or isopropanol. The employment of alcoholic hydrohalides, e.g. ethanolic hydrogen chloride, is especially preferred in this case. It is appropriate to effect the isomerization at room temperature or at an elevated temperature up to the boiling point of the mixture. When the isomerization is effected at room temperature, it is indicated to allow the reaction mixture to stand for several hours. When the isomerization is effected at elevated temperatures, the process is naturally completed in a shorter time. Thus, the rearrangement can be completed in about 60 to 90 minutes when working at the boiling point of the reaction mixture. Similar conditions obtain when effecting the isomerization in the presence of strong organic acids, such as anhydrous formic acid.

While again emphasizing that the invention is not limited by any theoretical explanation thereof, it may be supposed that in the course of the isomerization reaction there is first formed, upon addition of an equimolar quantity of acid, the acid addition salt of the geometrically asymmetric base, which salt is isomerized in the presence of excess acid. Said excess need not be great; however, if only an equimolar proportion of acid is present, no noticeable isomerization is observed. The isomerization of the acid addition salt without excess acid can, however, be accomplished by subjecting said salt to fusion, and maintaining the temperature somewhat above the melting point of the acid addition salt. For fusion processes of this character, it is preferred to employ the oxalate as the specific acid addition salt, and preferably excess oxalic acid is added to the melt.

Isomerization processes carried out according to the above described mode of execution result in a product which comprises approximately equal proportions of the two stereoisomers, as acid addition salts. If desired, the corresponding free bases can be liberated, e.g. by treatment with aqueous alkalies, such as dilute sodium hydroxide solution or ammonia, and one isomer can be separated from the mixture, e.g. by fractional crystallization; the residual isomer can then be subjected to repeated isomerization, thus effecting practically complete conversion to the desired product.

Geometrically asymmetric xanthenes and thioxanthenes, as defined above in connection with Formula I, are conventionally prepared by dehydrating the corresponding 9-hydroxy compounds of the formula (II) 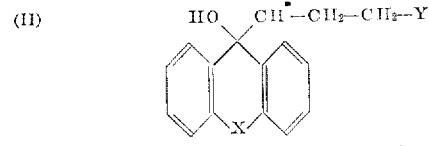

wherein the symbols X and Y have the same meanings, respectively, as defined above in connection with Formula I, and which are further substituted in an aromatic nucleus, as discussed above in connection with Formula I, by treatment with alcoholic hydrogen halides. The product of the dehydration process is a mixture comprising approximately equal proportions of the two stereoisomers.

It has now been further found that this dehydration can also be effected by heating a 9-hydroxy compound, as referred to above in connection with Formula II, in aqueous sulfuric acid, e.g. in 5 N sulfuric acid; or by fusing an oxalate of such a 9-hydroxy compound. Inasmuch as the conditions for dehydration are the same as those for isomerization, it is thus possible to combine the steps of (a) isomerization of an isomeric mixture enriched in one of the isomers, and (b) dehydration of the corresponding 9-hydroxy compound. This possibility is of considerable significance for the industrial manufacture of the above-mentioned xanthenes and thioxanthenes; insofar as the combination of the two stepes of isomerization and dehydration, wherein the starting material is a mixture of (a) a mother liquor obtained by separating the one isomer to as great an extent as possible and (b) an additional quantity of the corresponding 9-hydroxy compound, affords a continuous process for making the desired isomer. This embodiment of the processes of the invention can be effected, for example, by subjecting a mixture of equal proportions of (a) an isomeric mixture, enriched in one of the stereoisomers, and (b) a 9-hydroxy compound, to acid treatment, and then isolating the one isomer, e.g. by fractional crystallization; if desired, after alkalinization of the reaction mixture, e.g. by means of aqueous sodium hydroxide or ammonia. To the mother liquor, which is thus enriched in the other isomer, can then be added such a quantity of the corresponding 9-hydroxy compound as is equivalent to the one isomer which has been separated; and the resulting mixture can then be subjected to renewed acid treatment and isolation of the desired isomer. In the case where oxalic acid is employed as the acidic reagent, an additional advantage of the process resides in the fact that the oxalates are characterized by their ease of crystallization and purity: a circumstance which effects continuous purification of the mother liquors. This is important, in that the separation of isomers can be effected much more readily when a cis/trans base mixture of high purity, resulting from the step of liberating the bases, is employed as a starting material for the next cycle of processing.

According to another mode of execution, the acid treatment is advantageously effected by means of anhydrous mineral acids, such as sulfuric acid and phosphoric acid, or by means of concentrated aqueous or alcoholic mineral acids, such as hydrogen bromide and hydrogen chloride. Sulfuric acid is preferred. The concentration of the aqueous and alcoholic acids employed in this mode of execution is characterized by a lower limit. Although the isomerization can be effected even at a normality of 8, it is preferred, however, not to operate at a normality below 9. The acid treatment, which is best effected at room temperature, in this case results in an intermediate acid addition product, the solution of which is highly colored, usualy a blood-red color. Such colored solution can be subjected to immediate further processing. Thus, by acidic hydrolysis of the colored acid addition product there is obtained a cis/trans mixture, which comprises approximately equal proportions of the two stereoisomers. The hydrolysis can be effected, for example, by heating the colored, strongly acidic solution, after adding thereto a small quantity of water; thereup decolorization of the solution ensues, and by alkalizing the decolorized solution, an isomeric mixture of cis/trans bases is obtained. This can be separated into the two stereoisomeric forms, e.g. by fractional crystallization.

However, if the intermediate acid addition product is processed by slowly pouring the highly colored solution thereof into a large quantity of water, while cooling and stirring vigorously, and while maintaining neutral conditions insofar as possible, by use of buffers such as sodium acetate or alkalies such as dilute sodium hydroxide solution or dilute soda solution of pyridine bases, there is formed by hydration the corresponding 9-hydroxy compound as defined above in connection with Formula II, which hydroxy compound can then be dehydrated according to known procedures. For example, dilute mineral acids can be employed for the dehydration. However, other reagents can also be employed, e.g. iodine in benzene, potassium bisulfate, zinc chloride, and the like.

It is not necessary to isolate the 9-hydroxy compound prior to the dehydration step. However, such isolation from the reaction mixture is ordinarily desirable, because it affords a possibility of eliminating impurities, by recrystallization of the hydroxy compound from ethyl acetate, petroleum ether or methanol. Non-basic impurities can be removed, prior to dehydration, by extracting the solution obtained in the hydration step with a solvent, e.g. ether.

Upon dehydration of the 9-hydroxy compound there is obtained a product which comprises approximately equal proportions of the two stereoisomers. After separation of the one isomer from the mixture, the residual isomer can again be subjected to acid treatment, hydration and dehydration, thus effecting practically complete conversion into a desired steric form.

The invention is further disclosed in the following examples, which are illustrative but not limitative thereof. Temperatures are stated in degrees centigrade.

*Example 1*

10 g. of cis-2-chloro-9-(ω-dimethylamino-propylidene)-thioxanthene (the hydrochloride of which melts at 209°) is dissolved in 60 ml. of aqueous hydrobromic acid containing 63% by weight HBr. The blood-red solution is poured into 500 ml. of water while stirring well, and aqueous sodium hydroxide solution is added to a phenolphthalein endpoint. The resulting precipitate is taken up in ether and the ethereal solution is washed neutral with water. Upon drying the solution over sodium sulfate and distilling off the solvent, D,L-2-chloro-9-(ω-dimethylamino-propyl)-thioxanthen-9-ol is obtained in quantitative yield as colorless crystals having M.P. 153°.

In order to dehydrate the last mentioned compound, 10 g. thereof is heated at reflux with 80 ml. of 3 N sulfuric acid. First a red coloration appears, but this disappears upon heating. The reaction is completed in 10 minutes. The mixture is allowed to cool to room temperature and make alkaline to phenolphthalein with concentrated ammonia. The oil which separate is taken up in ether, the ethereal solution is washed neutral with water, dried over sodium sulfate and the solvent is driven off. There is obtained 9.1 to 9.3 g. of 2-chloro-9-(ω-dimethylamino-propylidene)-thioxanthene in the form of a colorless oil. The oil consists of approximately equal parts of the two stereoisomers, cis and trans. The readily crystallizable trans form of M.P. 98° can be separated by fractional crystallization, advantageously by employing a solvent, e.g. high boiling petroleum ether in an amount equal to four times the weight of the material to be fractionated.

*Example 2*

1 g. of cis-2-chloro-9-(ω-dimethylamino-propylidene)-thioxanthene is dissolved in 5 ml. of high boiling petroleum ether. To this solution is added 4 ml. of concentrated sulfuric acid ($d=1.84$) while agitating, whereupon the sulfuric acid phase becomes blood red in color. The sulfuric acid phase is separated from the petroleum ether and is dropped into 80 ml. of water while stirring well. The colorless aqueous solution which results is made alkaline to phenolphthalein by adding concentrated ammonia. The resulting precipitate of D,L-2-chloro-9-(ω-dimethylaminopropyl)-thioxanthen-9-ol is worked up according to the indications in Example 1 to yield trans-2-chloro-9-(dimethylamino-propylidene)-thioxanthene.

*Example 3*

50 g. of a cis/trans isomeric mixture of 2-chloro-9-(ω-dimethylamino-propylidene)-thioxanthene (having a content of about 20% of trans isomer, which in the pure form has M.P. 98–99°) is introduced while stirring into a cooled mixture of 100 g. of ice and 184 g. of sulfuric acid ($d=1.84$). The resulting blood-red solution is cooled to room temperature and then is poured in a thin stream into two liters of ice water while stirring continuously. A colorless solution results. (In some cases, when working with opalescent yellow isomeric mixtures from mother liquors, it is advantageous at this point to extract the aqueous solution with 0.5 liter of ether; in this way impurities comprising non-basic substances, can be extracted from the sulfuric acid solution.) The sulfuric acid solution is then made exactly alkaline to phenolphthalein by adding concentrated ammonia or 30% aqueous sodium hydroxide solution, while stirring and cooling. An almost colorless crystalline precipitate separates, and upon standing this becomes coarsely crystalline. Upon extraction of the precipitate with ether, washing the extract with water, drying and evaporating the solvent, there is obtained 54 g. of crude D,L-2-chloro-9-(ω-dimethyl-amino-propyl)-thioxanthen-9-ol having M.P. 148–149°. The crude material can be recrystallized from ethyl acetate, thereby raising the melting point to 153–154°. The dehydration can be accomplished in analogous manner to Example 1.

*Example 4*

6 g. of a cis-trans isomeric mixture of the hydrochlorides of 2-chloro-9-(ω-dimethylamino-propylidene)-thioxanthene having a content of about 25% of trans isomer is dissolved at 20°, while cooling, in a mixture of 10 ml. of water and 20 ml. of sulfuric acid ($d=1.84$). The red solution is then dropped into 500 ml. of ice water while stirring and the resulting solution is made alkaline to phenolphthalein with ammonia. The precipitate which separates is taken up in ether, the ether extract is washed free of alkali, dried over 1 g. of sodium sulfate, and the solvent is evaporated. There is obtained 6.5 g. of D,L-2-chloro-9-(ω-dimethylamino-propyl)-thioxanthen-9-ol of M.P. 153°. The conversion of this compound to 2-chloro-9-(ω-dimethylamino-propylidene)-thioxanthene is effected according to the indications in Example 1.

*Example 5*

1 g. of cis-2-chloro-9-(ω-dimethylamino-propylidene)- thioxanthene is dissolved in 20 ml. of 36.5% aqueous hydrochloric acid solution and the red solution is poured into 500 ml. of ice water while stirring well. By working in the manner described in Example 1, there is obtained D,L - 2 - chloro - 9 - (ω - dimethylamino - propyl) - thioxanthen-9-ol of M.P. 153°, which is dehydrated according to the indications in Example 1.

*Example 6*

10 g. of cis-2-chloro-9-(ω-dimethylamino-propylidene)-thioxanthene is dissolved in a mixture of 20 ml. of water and 20 ml. of sulfuric acid ($d=1.84$). The blood-red solution is diluted with 250 ml. of water and is heated for 10 minutes at reflux, whereupon the red color has disappeared. Then the solution is cooled and made alkaline with concentrated ammonia, and the oil which separates is taken up in ether. The ether solution is washed neutral with water, dried over sodium sulfate and the solvent is evaporated. The residue, 10 g., is a mixture of the cis and trans isomers of 2-chloro-9-(ω-dimethylamino-propylidene)-thioxanthene having a content of 50% of trans isomer. The readily crystallizable trans form can be isolated by proceeding in the manner set forth in Example 1.

Instead of using starting material which consists exclusively of cis isomer, an isomeric mixture comprising the cis and trans isomers can also be subjected to the sequence of reactions described in this example.

*Example 7*

5 g. of an isomeric mixture of the cis and trans forms of 2-chloro-9-(ω - dimethylamino - propylidene) - thioxanthene having a content of 75% of cis isomer, and 5 g. of 2 - chloro - 9 - (ω - dimethylaminopropyl) - thioxanthen-9-ol are refluxed with 200 ml. of 5 N sulfuric acid for one hour. The sulfuric acid solution is cooled and made alkaline to phenolphthalein by addition of ammonia. By working up the mixture according to the indications in Example 1, there are obtained 2.2 g. of trans-2-chloro-9-(ω-dimethylamino-propylidene)-thioxanthene having M.P. of 98–99°. The mother liquor, enriched in the cis isomer, can be subjected to renewed isomerization by treatment with acid.

*Example 8*

5 g. of cis-2-chloro-9-(ω-dimethylamino-propylidene)-thioxanthene (the hydrochloride of which melts at 209°) is refluxed for 3 hours with 200 ml. of 0.5 N hydrochloric acid. Then the reaction mixture is made alkaline to phenolphthalein by addition of sodium hydroxide solution. The oil which separates is taken up in ether. The ethereal extract is washed with water, dried over sodium sulfate and the solvent is driven off. There is thus obtained 5 g. of a mixture of equal parts of the cis and the trans isomers of 2-chloro-9-(ω-dimethylamino-propylidene)-thioxanthene in the form of a colorless oil. In order to isolate the readily crystallizable trans isomer, the mixture is diluted with 7.5 ml. of petroleum ether (boiling range 80–100°) and allowed to crystallize by standing in the refrigerator for 3 days. The crude crystalline precipitate is recrystallized from 3 to 4 ml. of methanol, yielding 1.4 g. of trans-2-chloro-9-(ω-dimethylamino-propylidene)-thioxanthene of M.P. 98°.

*Example 9*

1 g. of cis-2-chloro-9-(ω-dimethylamino-propylidene)-thioxanthene hydrochloride of M.P. 209° is melted. The melt is taken up in water and made alkaline to phenolphthalein with ammonia. A mixture of equal parts of the cis and trans isomers of 2-chloro-9-(ω-dimethylamino-propylidene)-thioxanthene separates. Isolation of trans-2 - chloro - 9 - (ω - dimethylamino - propylidene) - thioxanthene can be effected according to the indications in Example 8.

*Example 10*

10 g. of cis-2-chloro-9-(ω-dimethylamino-propylidene)- thioxanthene is dissolved in 200 ml. of 6 N sulfuric acid and allowed to stand at room temperature for 14 hours. The colorless solution is made alkaline to phenolphthalein with sodium hydroxide, whereupon an isomeric mixture of equal parts of the cis and trans isomers of 2-chloro-9-(ω-dimethylamino-propylidene)-thioxanthene separates. The isolation of the trans isomer can be effected according to the indications in Example 8.

*Example 11*

2 g. of cis-2-chloro-9-(ω-dimethylamino-propylidene)-thioxanthene is refluxed for 60 minutes in a mixture consisting of 20 ml. of ethanol and 4 ml. of 36% ethanolic hydrogen chloride. The reaction mixture is then poured into 200 ml. of water and made alkaline to phenolphthalein with ammonia, whereupon 2 g. of a cis/trans isomeric mixture of 2-chloro-9-(ω-dimethylamino-propylidene)-thioxanthene separates, which has a content of 1 g. of the trans isomer. The isolation of trans 2-chloro-9-(ω-dimethylamino-propylidene)-thioxanthene can be effected according to the indications in Example 8.

*Example 12*

1 g. of cis-2-chloro-9-(ω-dimethylamino-propylidene)-thioxanthene is refluxed for 90 minutes with 20 ml. of formic acid. Then the formic acid is distilled off to the point where the residue becomes syrupy. The residue is taken up in 30 ml. of water and is made alkaline to phenolphthalein by adding 3 N sodium hydroxide solution. In order to isolate the trans isomer, the reaction mixture is worked up according to the indications in Example 1, yielding 0.25 g. of trans-2-chloro-9-(ω-dimethylamino-propylidene)-thioxanthene having M.P. 98–99°.

*Example 13*

315 g. of 2-chloro-9-(ω-dimethylamino-propylidene)-thioxanthene having a content of 79% of the cis isomer, and 252 g. of oxalic acid are heated to 110° in an oil bath while stirring and maintained at this temperature for 30 minutes. Then the reaction vessel is evacuated for 5 minutes by use of a water pump, and to the still warm fluid melt is added 600 ml. of acetone while stirring. The viscous melt dissolves in the acetone and simultaneously the oxalate of the reaction product crystallizes. The mixture is stirred for an additional period of 30 minutes while cooling with ice water, then the crystalline slurry is filtered and washed with 300 ml. of acetone. The oxalate mixture obtained is suspended in 3 liters of water, covered with a layer of benzene, and made weakly alkaline to phenolphthalein by adding concentrated ammonia while shaking. The benzene layer is then separated, washed with 500 ml. of water and evaporated at 50° under a water pump vacuum. The residue is dissolved in 490 ml. of isopropyl ether and the solution is stirred for 2 hours at 0°. The crystalline precipitate is filtered off and washed with 245 ml. of low-boiling petroleum ether. Upon recrystallization from 280 ml. of isopropyl ether, and drying at 50° under a water pump vacuum, there is obtained 90 g. of trans-2-chloro-9-(ω-dimethylamino-propylidene)-thioxanthene having M.P. 98–99°.

*Example 14*

165 g. of a mixture of the cis and the trans isomers of 2-chloro-9-(ω-dimethylamino-propylidene)-thioxanthene having a content of 79% of the cis isomer (being the mother liquor remaining after separation of isomers), 158.4 g. of 2-chloro-9-(ω-dimethylamino-propyl)-thioxanthen-9-ol and 252 g. of oxalic acid are heated to 110° in an oil bath while stirring, and maintained at this temperature for 30 minutes. Then the reaction vessel is evacuated for 5 minutes by use of a water pump vacuum, and 600 ml. of acetone is added to the still warm fluid melt, while stirring. The viscous melt dissolves in the acetone and simultaneously the oxalate of the reaction product crystallizes out. The mixture is stirred for an additional period of 30 minutes while cooling with ice, the crystalline slurry is filtered, and washed with 300 ml. of acetone. The solid material is suspended in 3 liters of water, covered with a layer of 1 liter of benzene and made weakly alkaline to phenolphthalein by addition of concentrated ammonia while shaking. The benzene layer is separated, washed with 500 ml. of water and evaporated at 50° under a water pump vacuum. The residue is dissolved in 520 ml. of isopropyl ether, the solution is stirred for 2 hours at 0° and the crystalline precipitate filtered off and washed with 260 ml. of low-boiling petroleum ether. Upon recrystallization from 300 ml. of isopropyl ether and drying at 50° under a water pump vacuum, there is obtained 96.3 g. of trans-2-chloro-9-(ω-dimethylamino-propylidene)-thioxanthene having M.P. 98–99°. The simultaneously obtained 165.7 g. of mother liquor, enriched by the cis isomer, can be again subjected to the isomerization process. The oxalate mother liquors obtained yield, upon further purification via the oxalate (liberation of the base and repeated oxalate formation) a cis/trans mixture (1:1) of the end product, from which the trans base can be obtained pure by fractional crystallization.

We claim:

1. A process for the isomerization of material selected from the group consisting of:

(a) a substantially sterically uniform base of the formula

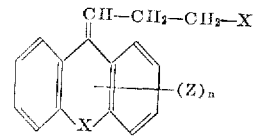

wherein X represents a member selected from the group consisting of oxygen and sulfur; Y represents a member selected from the group consisting of di(lower alkyl)amino, 1-piperidyl, 4-morpholyl, 4-(lower alkyl)-1-piperazyl and 4-hydroxyethyl-1-piperazyl; Z represents a substituent selected from the group consisting of lower alkyl, trifluoromethyl, aralkoxy, lower alkoxy, halo, lower alkanoyl, amino, hydroxyl and carboxyl; and $n$ represents an integer from 1 to 4, inclusive;

(b) an acid addition salt of a base defined in (a) above; and (c) stereoisomeric mixtures of (a) and (b) respectively wherein the stereoisomers are present in unequal proportions; which comprises heating said material in liquid phase at above about 110° C. for at least about 30 minutes with an excess of oxalic acid.

2. A process which comprises fusing an oxalic acid addition salt of a base defined by claim 1 by subjecting the salt to a temperature above its melting point.

3. A process according to claim 1 which comprises heating said material in solution with oxalic acid.

4. A process for the isomerization of material selected from the group consisting of:

(a) a substantially sterically uniform base of the formula

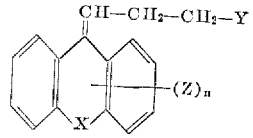

wherein X represents a member selected from the group consisting of oxygen and sulfur; Y represents a member selected from the group consisting of di(lower alkyl)amino, 1-piperidyl, 4-morpholyl, 4-(lower alkyl)-1-piperazyl and 4-hydroxyethyl-1-piperazyl; Z represents a substituent selected from the group consisting of lower alkyl, trifluoromethyl, lower alkoxy, halo, lower alkanoyl, amino, hydroxyl and carboxyl; and $n$ represents an integer from 1 to 4, inclusive;

(b) an acid addition salt of a base defined in (a) above; and (c) stereoisomeric mixtures of (a) and (b) respectively wherein the stereoisomers are present in unequal proportions; which comprises heating in liquid phase at above about 110° C. for at least about 30 minutes said mixture containing said material and a compound of the formula

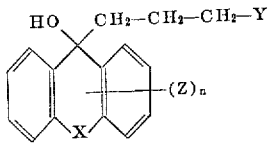

wherein the symbols X, Y, Z and $n$ have the same meaning as above with an excess of oxalic acid.

5. A process for the conversion of cis-2-chloro-9-(ω-dimethylamino-propylidene)-thioxanthene at least in part to the corresponding trans isomer, which comprises subjecting material containing said cis isomer, in excess over any trans isomer present, in liquid phase, to the action of excess oxalic acid for at least about 30 minutes at above about 110° C.

6. A process which comprises subjecting a mixture comprising 2-chloro-9-hydroxy-9-(ω-dimethylamino-propyl)-thioxanthene and 2-chloro-9-(ω-dimethylamino-propylidene)-thioxanthene, at least a major proportion of the latter being in cis form, to the action of excess oxalic acid for at least about 30 minutes at about 110° C., thereby forming a mixture comprising approximately equal proportions of cis- and trans-2-chloro-9-(ω-dimethylamino-propylidene)-thioxanthene.

References Cited in the file of this patent
UNITED STATES PATENTS

| | | |
|---|---|---|
| 2,940,969 | Bonvicino et al. | June 14, 1960 |
| 2,951,082 | Sprague et al. | Aug. 30, 1960 |
| 2,957,880 | Rometsch | Oct. 25, 1960 |
| 2,996,503 | Sprague et al. | Aug. 15, 1961 |

FOREIGN PATENTS

| | | |
|---|---|---|
| 1,044,103 | Germany | Nov. 20, 1958 |

OTHER REFERENCES

Houben-Weyl: "Methoden der Organischen Chemie," Band IV, part 2, pages 236–7 and 276–8; Georg Thieme Verlag, Stuttgart (1955).

Noller: Chemistry of Organic Compounds, 2nd ed., pages 354 to 356; W. B. Saunders Co., Philadelphia, 1957.

Migrdichian: "Organic Synthesis," vol. 2, pp. 835–6; Reinhold Pub. Corp., New York (1957).

Petersen et al.: Arzn. Forsch., vol. 8, No. 7, pages 395–7 (July 1958).

Fieser et al.: Organic Chemistry, 3rd ed., pp. 278–282, 284 and particularly page 287; D. C. Heath & Co., third printing 1958.

Rigaudy et al.: Comptes Rendus, vol. 249, pages 1008–1010 (July 14, 1959).

Bonvicino et al. II: J. Org. Chem., vol. 26, pages 2383–2392 (July 1961).

UNITED STATES PATENT OFFICE
CERTIFICATE OF CORRECTION

Patent No. 3,113,137            December 3, 1963

Sidney Frank Schaeren et al.

It is hereby certified that error appears in the above numbered patent requiring correction and that the said Letters Patent should read as corrected below.

Column 2, line 9, for "the acidic" read -- with acidic --; column 3, lines 20 to 25, for that portion of the formula reading $$\diagup CH\text{-}CH_2\text{-}CH_2\text{-}Y \quad \text{read} \quad \diagup CH_2\text{-}CH_2\text{-}CH_2\text{-}Y$$

line 47, for "stepes" read -- steps --; column 4, line 13, for "usualy" read -- usually --; line 20, for "thereup" read -- thereupon --; same column 4, line 31, for "of" read -- or --; column 5, line 1, for "make" read -- made --; line 2, for "separate" read -- separates --; column 9, line 18, after "above" insert a comma; column 10, line 13, for "Germany" read -- German Auslegeschrift --.

Signed and sealed this 2nd day of June 1964.

(SEAL)
Attest:

ERNEST W. SWIDER
Attesting Officer

EDWARD J. BRENNER
Commissioner of
patents